United States Patent
Yano et al.

(10) Patent No.: US 6,574,552 B2
(45) Date of Patent: Jun. 3, 2003

(54) NAVIGATION SYSTEM AND COMPUTER-READABLE INFORMATION RECORDED MEDIUM IN WHICH NAVIGATION CONTROL PROGRAM IS RECORDED

(75) Inventors: Kenichiro Yano, Tsurugashima (JP); Motoyuki Yamashita, Tokyo-to (JP); Koji Koga, Tokyo-to (JP); Motohiko Takayanagi, Tokyo-to (JP)

(73) Assignee: Poineer Corporation, Tokyo-to (JP)

( * ) Notice: Subject to any disclaimer, the term of this patent is extended or adjusted under 35 U.S.C. 154(b) by 0 days.

(21) Appl. No.: 09/955,189

(22) Filed: Sep. 19, 2001

(65) Prior Publication Data

US 2002/0035430 A1 Mar. 21, 2002

(30) Foreign Application Priority Data

Sep. 20, 2000 (JP) ........................................ 2000-285563

(51) Int. Cl.$^7$ .............................................. G01C 21/30
(52) U.S. Cl. ......................... 701/209; 701/26; 701/201; 701/211; 340/988
(58) Field of Search ............................... 701/21, 25, 26, 701/200, 201, 207, 209, 211; 340/988, 990, 995; 23/178 R (56) References Cited

U.S. PATENT DOCUMENTS

| | | | | |
|---|---|---|---|---|
| 5,343,399 A | * | 8/1994 | Yokoyama et al. | 701/211 |
| 5,475,599 A | * | 12/1995 | Yokoyama et al. | 701/211 |
| 5,906,654 A | * | 5/1999 | Sato | 701/210 |
| 6,317,685 B1 | * | 11/2001 | Kozak et al. | 701/210 |

* cited by examiner

Primary Examiner—Gertrude Arthur
(74) Attorney, Agent, or Firm—Nixon & Vanderhye P.C.

(57) ABSTRACT

A navigation system is provided with: an operation section that selects a scheduled route along which a vehicle is scheduled to move; a system controller that searches for a different route while the vehicle is moving along the scheduled route, the different route serving to reach a destination for which the mobile unit moves along the scheduled route, and compares the searched different route with the scheduled route for movement of the vehicle from a current position of the vehicle onward; and a display section that gives notice of a comparison result obtained by the controller.

15 Claims, 5 Drawing Sheets

NAVIGATION SYSTEM AND COMPUTER-READABLE INFORMATION RECORDED MEDIUM IN WHICH NAVIGATION CONTROL PROGRAM IS RECORDED

BACKGROUND OF THE INVENTION

1. Field of the Invention

The present invention pertains generally to navigation systems, and particularly to a navigation system that navigates a vehicle along a preselected route while giving a user a display of maps and visual and/or audible instructions, and a computer-readable information recorded medium in which a navigation control program for implementing the above navigation process is recorded.

2. Description of Related Art

In-vehicle navigation systems are widely used in recent years to navigate a vehicle, while displaying maps on a display such as a liquid-crystal display panel mounted in the vehicle.

Many navigation systems provide for routing by preselecting an appropriate route to a scheduled destination based on the time required to reach such destination, etc., and displaying the preselected route on the display at the time of departure to guide a user along the preselected route henceforward.

In such navigation systems, however, the route preselection is usually carried out only at the time of departure, with the sole exception that the preselected route is revised, when the vehicle is driving off such preselected route during travel, to reselect a new route to the scheduled destination from the current vehicle's position which is off the preselected route.

Thus, if the user is involved in traffic congestion, or encounters suspension of traffic, for example, along the preselected route, the navigation systems, due to having to cope with such contingencies along the preselected route, may not be able to provide appropriate instructions to the user, hence causing problems that he cannot arrive at the destination on schedule, for example.

SUMMARY OF THE INVENTION

The present invention has been made in view of the above problems, and an object thereof is, therefore, to provide a navigation system that can navigate a vehicle to a destination efficiently, even when the vehicle, for example, encounters unexpected situations along a route selected at the time of its departure, by appropriately optimizing the route to the destination on the way, and a computer-readable information recorded medium in which a navigation control program for implementing the above navigation process is recorded.

The above object of the present invention can be achieved by a navigation system of the present invention. The system is provided with: a route selecting device for selecting a scheduled route along which a mobile body is scheduled to move; a searching device for searching for a different route while said mobile body is moving along said scheduled route, said different route serving to reach a destination for which said mobile body moves along said scheduled route; a comparing device for comparing said searched different route with said scheduled route for movement of said mobile body from a current position of said mobile body onward; and a notifying device for notifying a comparison result obtained by said comparing device.

According to the present invention, a new route which is different from the scheduled route is searched during moving, and notice is given of the result of a comparison between the different route that is searched and the scheduled route, whereby the user can be informed of the best route available at that point of time during moving.

In one aspect of the present invention, a reselecting device for reselecting one of said scheduled route and said different route as a new scheduled route for said movement of said mobile body from said current position onward, based on notice given by said notifying device.

According to this aspect, the user can reselect the best route available for moving from the current position onward based on the given notice, for use as a new scheduled route.

In another aspect of the present invention, an acquiring device for acquiring traffic congestion information about traffic congestion along said scheduled route, from an external source, wherein said searching device starts searching for said different route upon acquisition of a new piece of said traffic congestion information.

According to this aspect, a search for a different route CL starts upon acquisition of a new piece of traffic congestion information, whereby the user can search for another different route based on the latest traffic congestion information.

In further aspect of the present invention, the system is further provided with a time measuring device for measuring time, wherein said searching device starts searching for said different route every time a preset time elapses.

According to this aspect, a search for a different route starts every time a preset time elapses, whereby the user can search for the best different route periodically.

In further aspect of the present invention, said notifying device gives notice of a time which is required to reach said destination if said mobile body moves along said different route.

According to this aspect, the user can recognize the shortest route to the destination.

In further aspect of the present invention, the system is further provided with a detecting device for detecting a diverging point at which said scheduled route and said different route diverge, wherein said notifying device gives notice of said comparison result upon arrival of said mobile body at a point which is away from said diverging point by a preset distance.

According to this aspect, notice is given of the different route upon arrival of the mobile unit at a point which is away from the diverging point by a preset distance, whereby the user can recognize the comparison result before the scheduled route and the different route diverge.

In further aspect of the present invention, said notifying device gives notice of said comparison result only upon determination, based on said comparison result, that said different route can bring said mobile unit to said destination earlier than said scheduled route if said mobile body moves along said different route.

According to this aspect, the user can recognize only such a comparison result as being useful for his travel to the destination.

In further aspect of the present invention, said notifying device gives said notice at least visually or audibly.

According to this aspect, the user can recognize the comparison result in a simple and easy way.

The above object of the present invention can be achieved by an information recorded medium of the present invention wherein a navigation control program is recorded so as to be read by a computer, said computer included in a navigation system for navigating a mobile body. The navigation control program causes said computer to function as: a selecting device for selecting a scheduled route along which a mobile body is scheduled to move; a searching device for searching for a different route while said mobile body is moving along said scheduled route, said different route serving to reach a destination for which said mobile body moves along said scheduled route; a comparing device for comparing said searched different route with said scheduled route for movement of said mobile body from a current position of said mobile body onward; and a notifying device for notifying a comparison result obtained by said comparing device.

According to the present invention, the computer is caused to function to search a new route which is different from the scheduled route during moving, and give notice of the result of a comparison between the different route that is searched and the scheduled route, whereby the user can be informed of the best route available at that point of time during moving.

In one aspect of the present invention, said navigation control program further causes said computer to as a reselecting device for reselecting one of said scheduled route and said different route as a new scheduled route for said movement of said mobile body from said current position onward, based on notice given by said notifying device.

According to this aspect, the user can reselect the best route available for moving from the current position onward based on the given notice, for use as a new scheduled route.

In another aspect of the present invention, said navigation control program further causes said computer to function as an acquiring device for acquiring traffic congestion information about traffic congestion along said scheduled route, from an external source, and said searching device starts searching for said different route upon acquisition of a new piece of said traffic congestion information.

According to this aspect, the computer is caused to function to start a search for a different route upon acquisition of a new piece of traffic congestion information, whereby the user can search for another different route based on the latest traffic congestion information.

In further aspect of the present invention, said navigation control program further causes said computer to function as a time measuring device for measuring time, and said searching device starts searching for said different route every time a preset time elapses.

According to this aspect, the computer is caused to function to start a search for a different route every time a preset time elapses, whereby the user can search for the best different route periodically.

In further aspect of the present invention, said notifying device gives notice of a time which is required to reach said destination if said mobile body moves along said different route.

According to this aspect, the user can recognize the shortest route to the destination.

In further aspect of the present invention, said navigation control program further causes said computer to function as a detecting device for detecting a diverging point at which said scheduled route and said different route diverge, and said notifying device gives notice of said comparison result upon arrival of said mobile body at a point which is away from said diverging point by a preset distance.

According to this aspect, the computer is caused to function to give notice of the different route upon arrival of the mobile unit at a point which is away from the diverging point by a preset distance, whereby the user can recognize the comparison result before the scheduled route and the different route diverge.

In further aspect of the present invention, said notifying device gives notice of said comparison result only upon determination, based on said comparison result, that said different route can bring said mobile body to said destination earlier than said scheduled route if said mobile body moves along said different route.

According to this aspect, the user can recognize only such a comparison result as being useful for his travel to the destination.

DETAILED DESCRIPTION OF THE PREFERRED EMBODIMENTS

The present invention will now be described with reference to preferred embodiments shown in the drawings.

The embodiments to be described below refer to cases where the invention is applied to a navigation system that navigates a vehicle as a mobile unit by displaying a preselected, scheduled route on a display section such as a display.

First, the configuration and operation of the navigation system according to one embodiment of the invention will be described in outline with reference to FIG. 1 which shows such navigation system.

Figure 1:
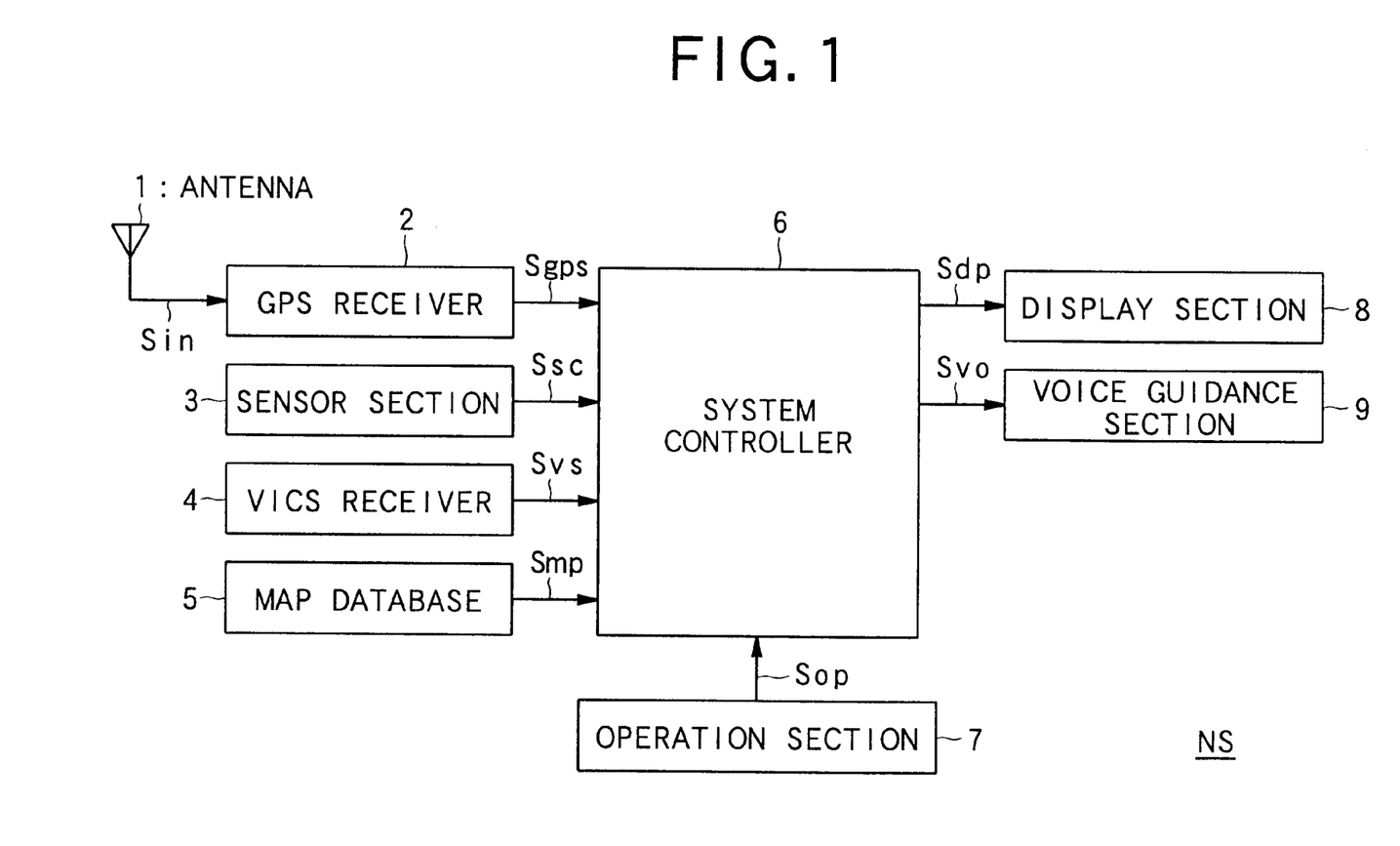
FIG. 1 is a block diagram showing the general configuration of a navigation system according to one embodiment of the present invention.

As shown in FIG. 1, the navigation system NS according to this embodiment includes an antenna 1, a GPS (Global Positioning System) receiver 2, a sensor section including a distance sensor for detecting the distance traveled and velocity of the vehicle and an angular velocity sensor for detecting the angular velocity when the vehicle makes a turn, a VICS (Vehicle Information and Communication System) receiver 4 as an acquisition device, a map database 5, system controller 6 as a time measurement device, detection device, search device and comparison device, an operation section 7 as a route selection device and reselection device, a display section 8 as a notification device configured of, e.g., a liquid-crystal display, and a voice guidance section 9 including a voice amplifier and audio speakers.

Next, the operation of this system will be described in outline.

The antenna 1 receives navigation radio waves from a plurality of GPS satellites, and generates a received signal Sin for application to the GPS receiver 2.

In response to the signal Sin, the GPS receiver 2 generates a GPS signal Sgps containing information such as current time or current vehicle position, etc. based on position information, etc. contained in the received signal Sin, and applies the generated signal Sgps to the system controller 6.

The sensor section 3 generates a position signal Ssc indicative of an independently calculated current vehicle position (i.e., a current position obtained by integrating the distance traveled and the direction of travel from a start point as a point of origin) based on detection results obtained by its sensors, and applies the generated signal Ssc to the system controller 6.

In response to these signals Sgps and Ssc, the system controller 6, mainly using the current position indicated by the position signal Ssc and correcting such current position through the current position information, etc. indicated by the GPS signal Sgps, detects a corrected current position of the vehicle. The controller 6 then outputs the detected current vehicle position to the display section 8 as a display signal Sdp, so that the section 8 will display a position mark, etc. indicative of the detected current position on its display screen.

The VICS receiver 4 receives VICS information containing traffic congestion information, etc. transmitted from the VICS, and generates a VICS signal Svs containing the traffic congestion information, etc. for application to the system controller 6.

The map database 5, which is comprised of a DVD-ROM (DVD-Read Only Memory) drive, or a hard drive, etc., collectively stores map information to be displayed on the display section 8 for use in a navigation process, and searches for needed map information to generate a map signal Smp for application to the system controller 6.

The operation section 7 generates, upon operation by a user in order to execute the navigation process, an operation signal Sop corresponding to the performed operation, and applies the generated signal Sop to the system controller 6.

The display section 8 displays information needed to execute the navigation process based on the display signal Sdp sent from the system controller 6, for presentation to a driver, etc. The information displayed by the display section 8 includes the map information stored in the map database 5 (including road information indicative of, for example, road location and width, way-point information, and point-of-interest information), and further some textual navigation information, time information such as scheduled arrival time or current time, and technical information indicative of GPS radio wave receiving conditions.

The voice guidance section 9 prepares audio instructions, etc. necessary for the navigation process in the form of synthesized speech based on voice control signals Svo from the system controller 6, for announcement within the vehicle.

In parallel with the operations performed by these components, the system controller 6 supervises control over retrieval of the map information stored in the map database 5, display by the display section 8, output of the audio instructions, etc. by the voice guidance section 9, a routing routine to be described below, and other system operation, in addition to the above-mentioned control over display of the position mark, etc.

Next, a data structure for the road information stored in the map database 5 will be described with reference to FIG. 2, which shows an exemplary data structure for the map information.

Figure 2:
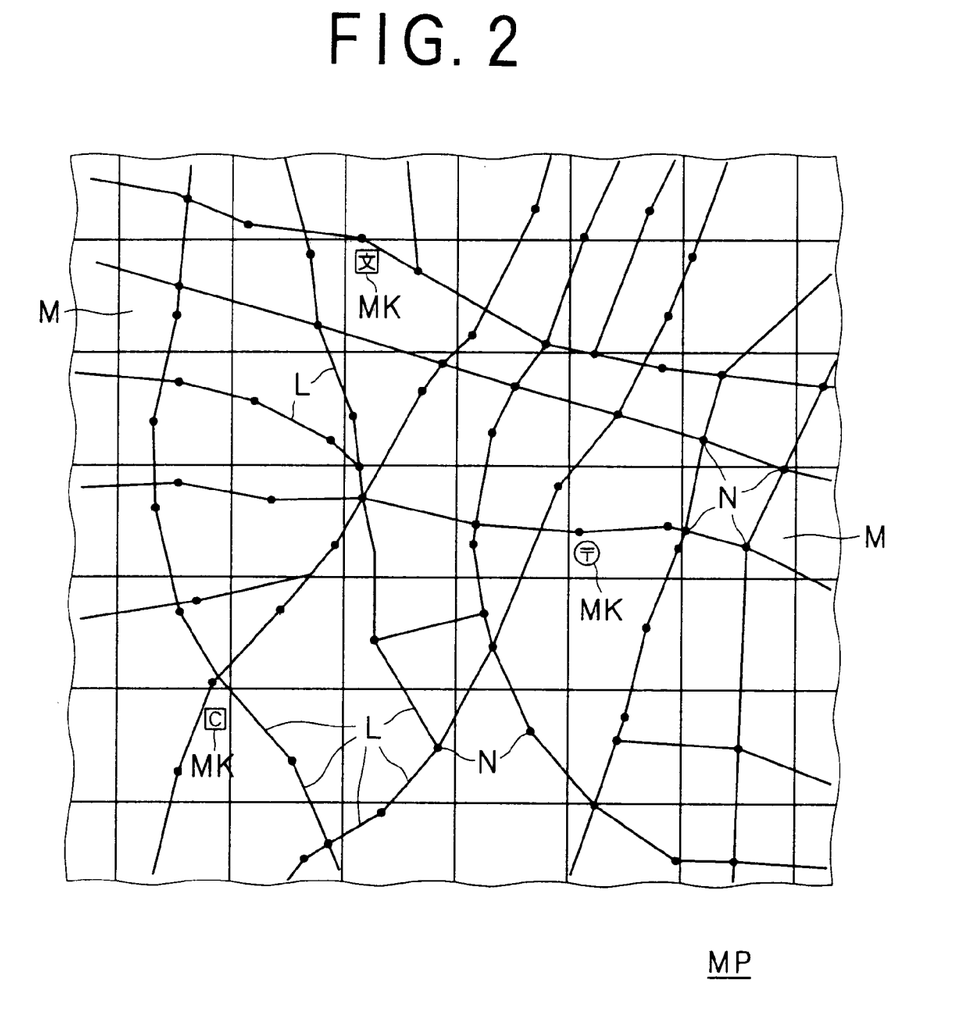
FIG. 2 is a schematic showing an example of a data structure for map information.

The map database 5 stores the map information MP in the form of a series of vertically and horizontally extending square meshes M, each side of which having a prescribed length (a length reduced at a scale ratio of the map), such as shown in FIG. 2. Each mesh M is given an identifying number.

Roads in the map information MP are represented in the form of a series of links L which are road segments interconnected at nodes N (indicated as bullets in FIG. 2, which are equivalent of the road joints (i.e., intersections, curves, forks, or junctions). Each node N is stored together with location information (in terms of longitude/latitude coordinates) and an identifying number. Each link L is stored together with an identifying number and information indicative of the two nodes N located at both ends thereof.

Further, landmarks, etc. in the map information MP are stored together with marks MK representing themselves and their location information (in terms of longitude/latitude coordinates).

The map information MP also includes name information, etc. indicative of the names of intersections.

The map information MP exemplified in FIG. 2 comes in multiple versions on different scales for each of different areas. The map database 5 stores the above-mentioned information on each node N, link L, landmark, etc., name, and the like, for each version of the map information MP.

Figure 3:
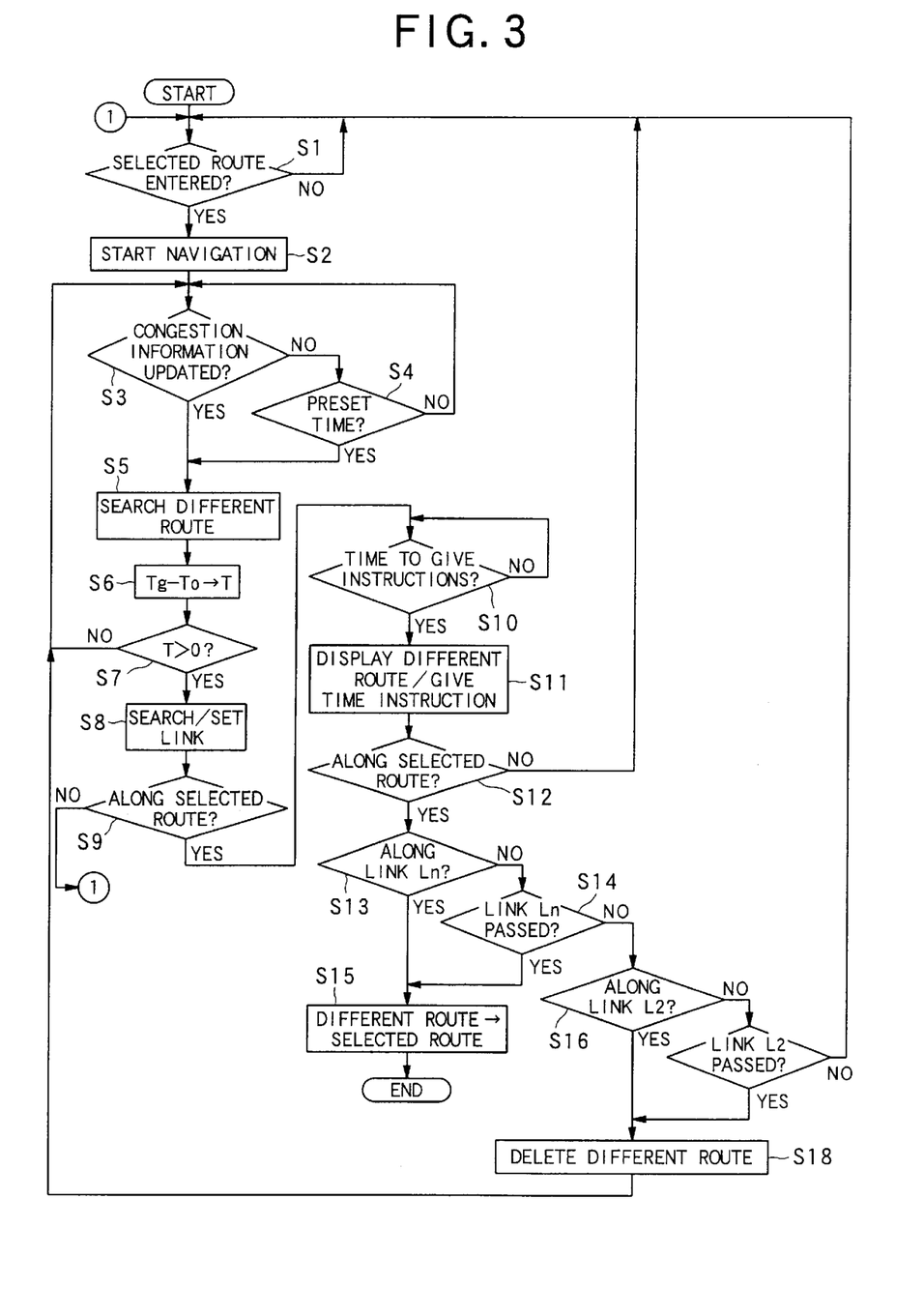
FIG. 3 is a flowchart showing a navigation process according to the embodiment.
Figure 4:
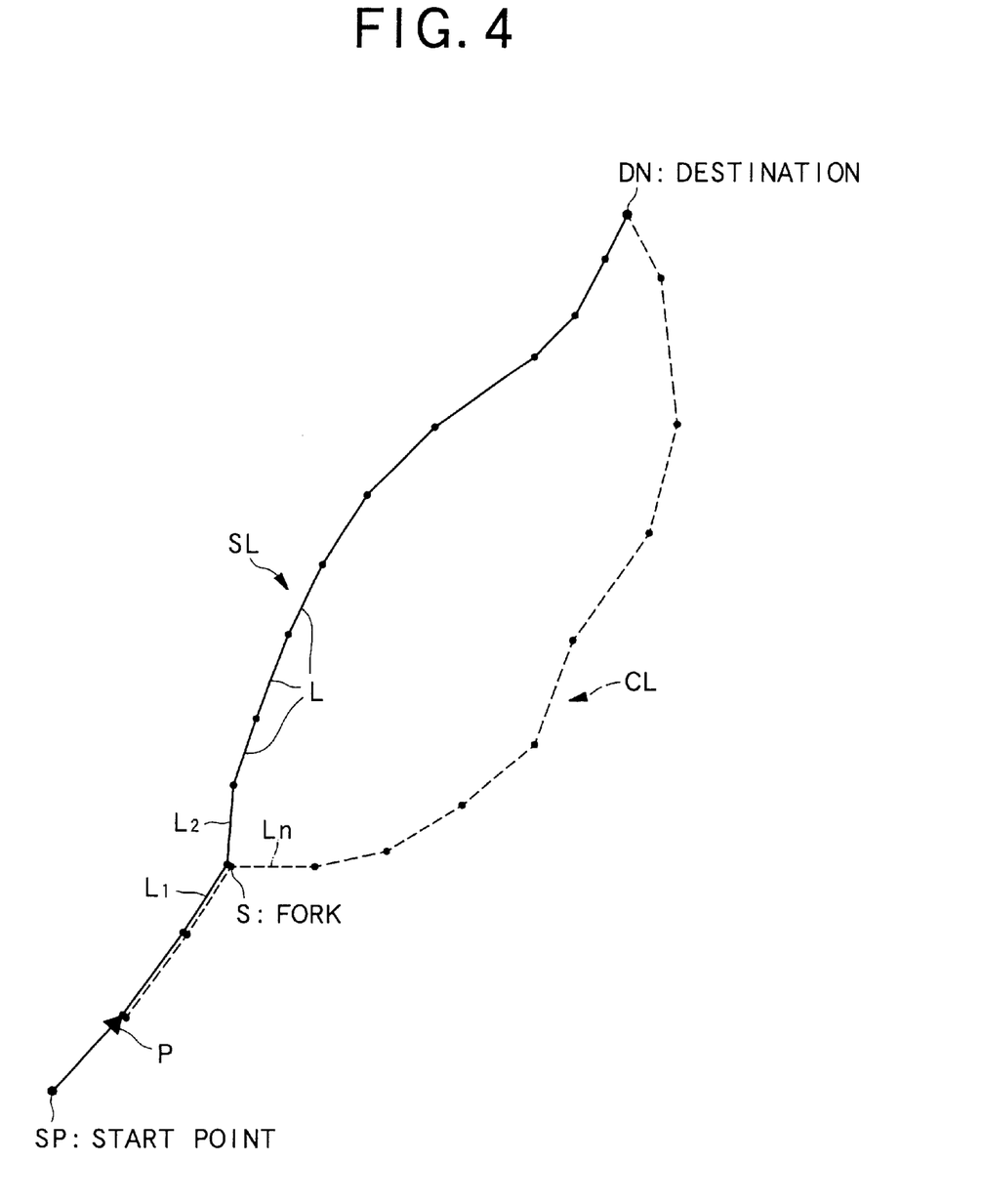
FIG. 4 is a diagram illustrating the navigation process according to the embodiment.
Figure 5A:
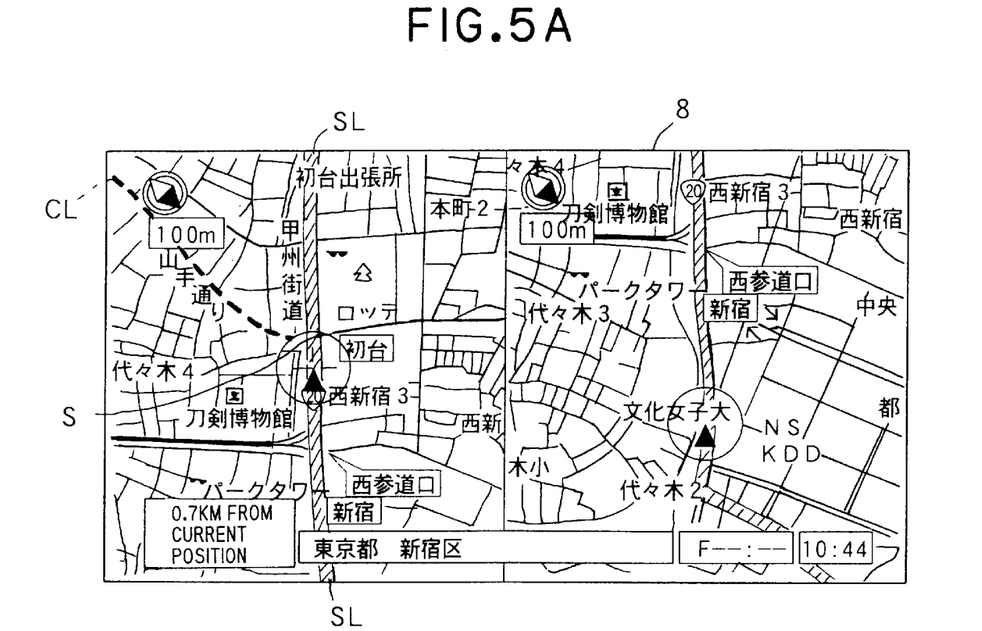
FIGS. 5A and 5B are diagrams respectively showing a first example and a second example of images displayed in a routing routine according to the embodiment.
Figure 5B:
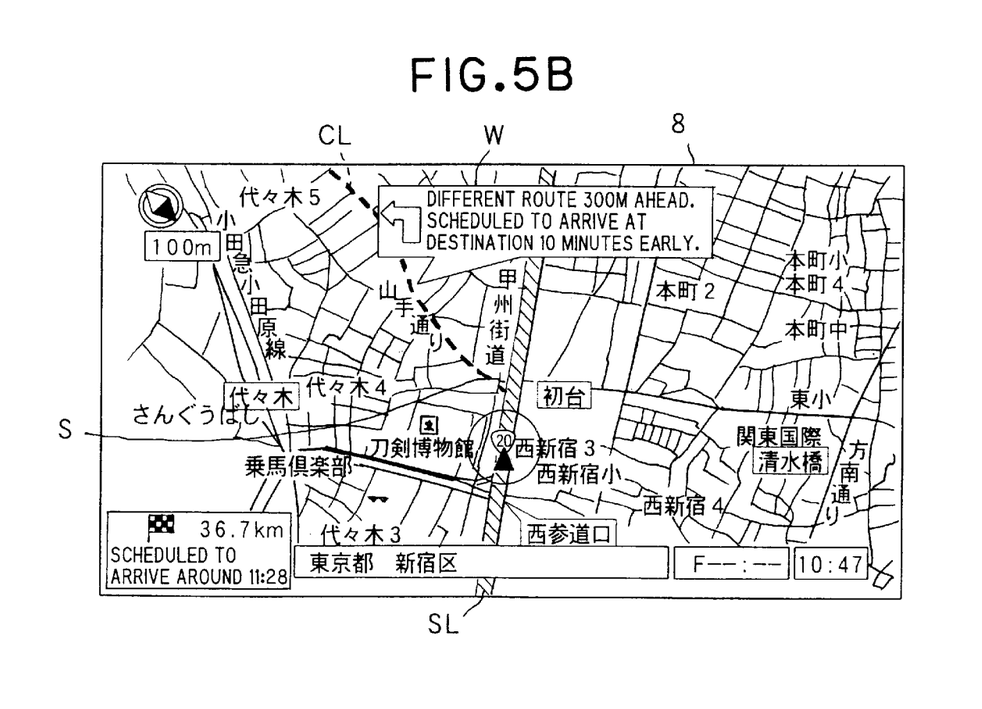

Next, the navigation process including the routing routine according to the embodiment of the invention will be described with reference to FIGS. 3 to 5A and 5B, in which: FIG. 3 is a flowchart showing the navigation process; FIG. 4 is a diagram illustrating the same process; and FIGS. 5A and 5B show exemplary images displayed in the routing routine. The execution of the navigation process of FIG. 3 precedes the start of driving a vehicle.

As shown in FIG. 3, the navigation process including the routing routine according to the embodiment, which is executed mainly by the system controller 6, determines whether a scheduled route is selected by designating a destination, a start point, and a through path prior to the driving start (step S1).

If the scheduled route is not yet selected ("NO" in step S1), the system waits until the selection is completed. Otherwise, in step S2, the system starts navigation along the route selected in step S1 thereinafter referred to simply as "selected route") as the vehicle starts driving.

Then, upon start of driving, the system starts monitoring the VICS information about traffic congestion along the selected route (hereinafter referred to simply as "congestion information") to check if the congestion information is updated or not, i.e., whether new congestion information is acquired via the VICS receiver 4 (step S3), and also starts measuring the current time (step S4).

If the congestion information is not yet updated ("NO" in step S3), the system checks if a prescribed time (every hour or every 30 minutes, for example) has elapsed as the current time being measured (step S4). If such prescribed time has not elapsed yet ("NO" in step S4), the system then returns directly to the step of monitoring the congestion information (step S3).

On the other hand, if it is determined that the congestion information is updated ("YES" in step S3), or that the prescribed time has elapsed ("YES" in step S4), then the system starts searching for a route to the destination, which is different from the selected route, using the vehicle's current position as a point of origin at the current timing (step S5).

Let it now be supposed, as shown in FIG. 4, that, in step S5 executed when the vehicle is currently located at a point P along a selected route SL (the route selected before departure (see step S1)) to a destination DN (point of termination) from a start point SP (point of origin), a different route CL is searched, the route CL (whose point of termination is, of course, the destination DN) diverging from the selected route SL at a fork S.

When the different route CL is searched, a time Tg required to reach the destination DN from the point P along the selected route SL is detected by referring to the up dated congestion information, etc. (see step S3), and a time To required to reach the destination DN from the point P along the different route CL is also detected by referring to the same information, etc., and further a difference T between the times Tg and To is calculated (step S6) to check if the time difference T is positive or not (step S7).

If the time differene T is negative ("NO" in step S7), the system returns directly to step S3 to keep navigating the vehicle along the selected route SL, judging that the route SL brings the vehicle to the destination DN earlier than the different route CL.

If, on the other hand, the time difference T is positive ("YES" in step S7), judging that the different route CL that is searched brings the vehicle to the destination DN earlier, the system then searches for links L located along the direction of travel of the vehicle from the point P by performing a search along the direction of travel of the vehicle, thereby to detect a link L1 to the fork S along the selected route SL (which is also a link to the fork S along the different route CL) which is immediately before the fork S, a link L2 along the selected route SL which is immediately after the fork S, and a link Ln along the different route CL which is immediately after the fork S, for storage in a memory (not shown) within the system controller 6 (step S8).

Then, the system checks if the vehicle is still along the selected route SL which is before the fork S (step S9), and if the vehicle is off the route SL ("NO" in step S9), the system returns to step S1 in order to reselect a route SL, etc. If the vehicle is still along the selected route SL ("YES" in step S9), then the system checks that the distance from the point P, which is the current position, to the fork S equals a prescribed distance for guidance (a distance for guidance of approximately 300 meters which is preset as a distance to the fork S through which the system informs the driver in advance before he reaches the fork S that he could take the route CL other than the route SL) (step S10). If the vehicle has not yet arrived at the point P which is away from the fork S by such a distance ("NO" in step S10), the system allows the vehicle to travel to the point P, without proceeding to the next step. Otherwise ("YES" in step S10), the system specifically displays the different route CL including the fork S on the display section 8 to inform the driver of the availability of the different route CL, the time required to reach the destination if the different route CL is selected, and other relevant information (step S11).

In one embodiment, the information given in step S11 may include, as shown in FIG. 5A, for example, a visual display of a map covering the fork S, the selected route SL and the different route CL on the display section 8, together with an audible instruction, such as "DIFFERENT ROUTE AVAILABLE IF YOU TURN LEFT 300 METER'S AHEAD. YOU CAN ARRIVE AT YOUR DESTINATION T MINUTES EARLY," generated via the voice guidance section 9. Alternatively, as shown in FIG. 5B, a warning W informing the driver of the availability of the different route CL and the time difference T may be displayed while superimposed on a map covering both the selected route SL and the different route CL.

Upon informing the driver about the different route CL (step S11), the system checks again if the vehicle is still along the selected route SL which is ahead of the fork S (step S12). If the vehicle is off the selected route SL ("NO" in step S12), the system returns to step S1 in order to reselect a route SL, etc. Otherwise ("YES" in step S12), the system determines whether the vehicle has reached the link Ln (step S13).

If the vehicle has not reached the link Ln ("NO" in step S13), the system determines whether the vehicle has already passed the link Ln (step S14).

If it is determined in step S13 or S14 that the vehicle has reached or passed the link Ln, then the system, judging that the vehicle is traveling along the different route CL, causes the operation section 7, etc. to select the different route CL as a new selected route SL (step S15), and continues to execute the navigation until the vehicle reaches the destination DN at which the process is brought to an end.

On the other hand, if the vehicle has not passed the link Ln ("NO" in step S14), then the system determines whether the vehicle has reached the link L2 (step S16).

If the vehicle has not reached the link L2 ("NO" in step S16), the system determines whether the vehicle has already passed the link L2 (step S17).

If the vehicle has reached or passed the link L2 ("YES" in step S16 or S17), then the system, judging that the vehicle is still traveling along the selected route SL, deletes the different route CL from the memory within the system controller 6 (step S18), and returns to step S3 in order to search for another different route.

If the vehicle has not passed the link L2 ("NO" in step S17), the system returns to step S1 in order to reselect a route SL, etc.

As described in the foregoing, the navigation process according to the above embodiments allows the user to search for a route CL which is different from a selected route SL during driving along the selected route SL, and informs him of the result of a comparison between the different route CL that is searched and the selected route SL, whereby the user can be informed of the best route available at that point of time during driving.

Therefore, the user can select the best route in consideration of new information that he could not have acquired at the time of his departure. Additionally, even when the user was not able to select the route SL as carefully and accurately as he should have upon his departure, he can arrive at the destination DN while optimizing the selected route SL whenever necessary on his way.

Further, the user can reselect one of the selected route SL and the different route CL as a new selected route for driving from the current position onward, based on the comparison result of which he is informed, whereby the user can reselect the best route available for driving from the current position onward based on the given information, for use as a new selected route SL.

Further, a search for a different route CL starts upon acquisition of a new piece of congestion information, whereby the user can search for another different route CL based on the latest traffic congestion information.

Still further, a search for a different route CL starts every time a prescribed time elapses, whereby the user can search for the best different route CL periodically.

Still further, information is given about the time which is required to reach the destination DN if the vehicle drives along the different route CL, whereby the user can recognize the shortest route to the destination DN.

Still further, information about the different route CL is given upon arrival of the vehicle at a point which is a prescribed distance away from the fork S, whereby the user can recognize the availability of the different route CL before he arrives at the fork S at which the selected route SL and the different route CL diverge.

Still further, information about the different route CL is given only upon determination that the different route CL can bring the vehicle to the destination earlier than the selected route SL if the vehicle travels along the different route CL, whereby the user can recognize only such information as being useful for his travel to the destination DN.

Still further, the information is given in the form of at least one of visual and audible instructions, whereby the user can recognize the information about the different route CL in a simple and easy way.

While the cases where the invention is applied to executing the navigation process using the navigation system mounted in a vehicle has been described in the above embodiments, the invention can be applied to a mobile unit that is a pedestrian as well.

That is, in one embodiment, the navigation process of the invention can be applied to the pedestrian who is carrying a cellular telephone provided with functions including map displaying and routing using such telephone. The navigation process can be executed via the cellular telephone that communicates with, for example, its base stations, etc. In this embodiment, the map information must include sidewalks for pedestrians, in addition to roadways.

Further, a program corresponding to the flowchart shown in FIG. 3 is stored in an information storage device, such as a flexible disk or a hard disk, for retrieval and execution by a mobile personal computer, etc., whereby the personal computer can function as the navigation system NS according to the above embodiments.

In the above embodiments, a navigation system mounted in a vehicle, a cellular telephone, etc. (hereinafter referred to simply as "vehicle, etc.") executes the whole navigation process. Additionally, in one embodiment, the invention may be applied to the vehicle, etc. which are connected to an independent navigation center via wireless transmission for data communication therebetween to execute the navigation process of the invention.

In this embodiment, the navigation center receives information sent from the vehicle, etc., such as the current position and velocity detected by the vehicle, etc., and the destination thereby selected, to execute the steps S2, S3, S5 to S7, S15 and S18, and transmits the results of the executed steps to the vehicle, etc. at prescribed timings, thereby to execute the navigation process according to the above embodiments.

In this method in which the navigation process according to the disclosed embodiments is executed by involving the navigation center and the vehicle, etc. on a shared basis, information about traffic congestion, road construction, and other road conditions in far remote areas which the vehicle, etc. alone could not otherwise acquire can be utilized for effective execution of the navigation process.

Therefore, the user can select the best route available to his destination timely and appropriately during driving to arrive at the destination efficiently.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-285563 filed on Sep. 20, 2000 including the specification, claims, drawings and summary is incorporated herein by reference in its entirety.

What is claimed is:

1. A navigation system comprising:
   a route selecting device for selecting a scheduled route along which a mobile body is scheduled to move;
   a searching device for searching for a different route while said mobile body is moving along said scheduled route, said different route serving to reach a destination for which said mobile body moves along said scheduled route;
   a comparing device for comparing said searched different route with said scheduled route for movement of said mobile body from a current position of said mobile body onward; and
   a notifying device for notifying a comparison result obtained by said comparing device.

2. The navigation system according to claim 1, further comprising
   a reselecting device for reselecting one of said scheduled route and said different route as a new scheduled route for said movement of said mobile body from said current position onward, based on notice given by said notifying device.

3. The navigation system according to claim 1, further comprising
   an acquiring device for acquiring traffic congestion information about traffic congestion along said scheduled route, from an external source,
   wherein said searching device starts searching for said different route upon acquisition of a new piece of said traffic congestion information.

4. The navigation system according to claim 1, further comprising
   a time measuring device for measuring time,
   wherein said searching device starts searching for said different route every time a preset time elapses.

5. The navigation system according to claim 1, wherein said notifying device gives notice of a time which is required to reach said destination if said mobile body moves along said different route.

6. The navigation system according to claim 1, further comprising
   a detecting device for detecting a diverging point at which said scheduled route and said different route diverge,
   wherein said notifying device gives notice of said comparison result upon arrival of said mobile body at a point which is away from said diverging point by a preset distance.

7. The navigation system according to claim 1, wherein said notifying device gives notice of said comparison result only upon determination, based on said comparison result, that said different route can bring said mobile unit to said destination earlier than said scheduled route if said mobile body moves along said different route.

8. The navigation system according to claim 1, wherein said notifying device gives said notice at least visually or audibly.

9. An information recorded medium wherein a navigation control program is recorded so as to be read by a computer, said computer included in a navigation system for navigating a mobile body, said navigation control program causing said computer to function as a selecting device for selecting a scheduled route along which a mobile body is scheduled to move;

a searching device for searching for a different route while said mobile body is moving along said scheduled route, said different route serving to reach a destination for which said mobile body moves along said scheduled route;

a comparing device for comparing said searched different route with said scheduled route for movement of said mobile body from a current position of said mobile body onward; and a notifying device for notifying a comparison result obtained by said comparing device.

10. The information recorded medium according to claim 9, wherein said navigation control program further causes said computer to as a reselecting device for reselecting one of said scheduled route and said different route as a new scheduled route for said movement of said mobile body from said current position onward, based on notice given by said notifying device.

11. The information recorded medium according to claim 9, wherein said navigation control program further causes said computer to function as an acquiring device for acquiring traffic congestion information about traffic congestion along said scheduled route, from an external source, and said searching device starts searching for said different route upon acquisition of a new piece of said traffic congestion information.

12. The information recorded medium according to claim 9, wherein said navigation control program further causes said computer to function as a time measuring device for measuring time, and said searching device starts searching for said different route every time a preset time elapses.

13. The information recorded medium according to claim 9, wherein said notifying device gives notice of a time which is required to reach said destination if said mobile body moves along said different route.

14. The information recorded medium according to claim 9, wherein said navigation control program further causes said computer to function as a detecting device for detecting a diverging point at which said scheduled route and said different route diverge, and said notifying device gives notice of said comparison result upon arrival of said mobile body at a point which is away from said diverging point by a preset distance.

15. The information recorded medium according to claim 9, wherein said notifying device gives notice of said comparison result only upon determination, based on said comparison result, that said different route can bring said mobile body to said destination earlier than said scheduled route if said mobile body moves along said different route.

* * * * *